United States Patent Office 2,866,831
Patented Dec. 30, 1958

2,866,831

CATALYTIC PROCESS FOR PRODUCING 1-METHYLCYCLOHEXENE

Arthur Lambert and Herbert Palfreeman, Blackley, Manchester, England, assignors to Imperial Chemical Industries Limited, a corporation of Great Britain No Drawing. Application November 12, 1954
Serial No. 468,576

Claims priority, application Great Britain November 16, 1953

3 Claims. (Cl. 260—666)

This invention relates to a catalytic chemical process for the manufacture of 1-methylcyclohexene.

When 2-methylcyclohexanol is dehydrated by means of the usual dehydrating agents, such as sulphuric acid and alumina, there is obtained a mixture of the three isomeric methylcyclohexenes usually containing not more than 50% of 1-methylcyclohexene.

We have now found that when the dehydration is performed in the presence of an acid-activated bleaching earth in the liquid phase, an excellent yield of 1-methylcyclohexene is obtained.

Thus according to the present invention we provide a process for the manufacture of 1-methylcyclohexene which comprises heating liquid 2-methylcyclohexanol in the presence of an acid-activated bleaching earth.

In order to avoid de-activation of the earth it is desirable to remove from the reaction mixture the water formed during the reaction. This may conveniently be achieved by heating the mixture to such a temperature that the water and the methylcyclohexene are removed by distillation, leaving the unreacted 2-methylcyclohexanol and the earth. Suitable temperatures are from 120° to 150° C.

The process can be made continuous by adding fresh 2-methylcyclohexanol as fast as it is used.

The amount of 1-methylcyclohexene in the product depends to some extent upon the ratio of cis- and trans-isomers in the 2-methylcyclohexanol. Pure trans-2-methylcyclohexanol gives a product containing 77% 1-methylcyclohexene, while a 2-methylcyclohexanol containing 75% cis- and 25% trans- gives a product containing 93% 1-methylcyclohexene.

At the beginning of the dehydration process with a mixture containing 35–40% cis- and 60–65% trans-, the crude methylcyclohexene produced, which is readily separater from the water with which it is immiscible, contains 95% or more of 1-methylcyclohexene. As the reaction proceeds the 1-methylcyclohexene content slowly falls to 85–90%.

The crude product may be purified by fractional distillation or it may be used in the crude form for example for the manufacture of antioxidants, in the manner described in specification No. 29,721/51.

The invention is illustrated but not limited by the following example in which parts and percentages are by weight.

Example 1

136 parts of 2-methylcyclohexanol containing 35–40% cis- and 60–65% trans- prepared by catalytic hydrogenation of o-cresol over Raney nickel at 200 atmospheres pressure and 140–160° C. and 10 parts of an acid-activated bleaching earth are put in a vessel provided with a stirrer and a short fractionating column leading to a water cooled Liebig condenser. A receiver adapted to provide a measure of the distillate is attached to the condenser. The mixture is heated to such a temperature that a mixture of methylcyclohexene and water distils and unchanged 2-methylcyclohexanol remains in the vessel, the temperature at the top of the column being 82–90° C. Distillation having begun, further 2-methylcyclohexanol is added conveniently at approximately the same rate as the olefine and water distils. The distillate separates into two layers, the upper layer being 1-methylcyclohexene. At the end of 2 hours, 86 parts of 2-methylcyclohexanol having been added, 67 parts of a colourless liquid containing 96% of 1-methylcyclohexene are obtained. After a total of 12¼ hours, 364 parts of 2-methylcyclohexanol having been added, a total of 375 parts of a colourless liquid containing 89% of 1-methylcyclohexene are obtained and 80 parts of 2-methylcyclohexanol remain in the flask. The 1-methylcyclohexene content of the product obtained during the 5th and 6th hours is 86% and that obtained during the last 2 hours is 88%. The crude 1-methylcyclohexene can be purified by fractionation.

Example 2

300 parts of 2-methylcyclohexanol containing 35–40% cis- and 60–65% trans-, prepared as described in Example 1 and 60 parts of an acid activated bleaching earth are stirred at 140° C. for 3 hours in an enamel lined autoclave. A pressure of 75 lbs./sq. in. develops in the autoclave during this operation. After cooling, the product is filtered and distilled through a fractionating column. The first fraction boiling up to 110° C. separates into two layers. The upper layer is separated from the lower water layer, dried over calcium chloride and redistilled, giving 32.5 parts of 1-methylcyclohexene, B. P. 110° C.

What we claim is:

1. Process for the manufacture of a product which consists primarily of 1-methylcyclohexene which comprises heating liquid 2-methylcyclohexanol at a temperature between 120° and 150° C., in the presence of an acid-activated bleaching earth and maintaining said 2-methylcyclohexanol in the liquid phase during said heating, said 2-methylcyclohexanol containing 35–40% by weight of cis- and 60–65% by weight of trans-2-methylcyclohexanol.

2. Process for the manufacture of a product which consists primarily of 1-methylcyclohexene as claimed in claim 1 wherein water formed during the reaction is removed from the reaction mixture.

3. Process for the manufacture of a product which consists primarily of 1-methylcyclohexene as claimed in claim 2 wherein the reaction mixture is heated to such a temperature that the water and the methylcyclohexene are removed by distillation.

References Cited in the file of this patent

UNITED STATES PATENTS 2,186,370    Dosser _____ Jan. 9, 1940

FOREIGN PATENTS 451,535    Germany _____ Oct. 6, 1927

OTHER REFERENCES

Berichte de deutschen Chemische Gesellschaft (Germany), vol. 45, 1912, p. 3216.

Berichte de deutschen Chemische Gesellschaft (Germany), vol. 62, 1929, p. 1127C.

Chemisches Zentrablatt (Germany), 1935, vol. 1, p. 1224(C).

Price: Jour. Amer Chem. Soc., vol. 61, (1939), p. 1847.

Mosher: Jour. Amer. Chem. Soc., vol. 62 (March 1940), pp. 552–554.

Tilichenko: Zhur. Obshchei Khim. (Jour. Gen. Chem.), vol. 20 (1950), pp. 2152–2157, abstracted in Chemical Abstracts, vol. 45 (1951), p. 7029d.